W. YOUMANS.
Car Wheel.
No. 48,230.
Patented June 13, 1865.
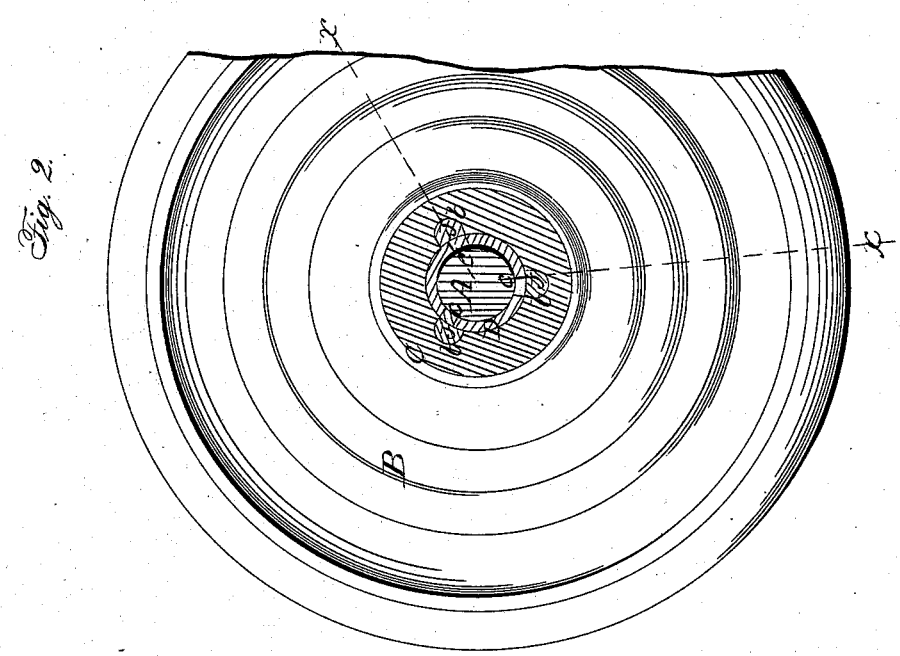
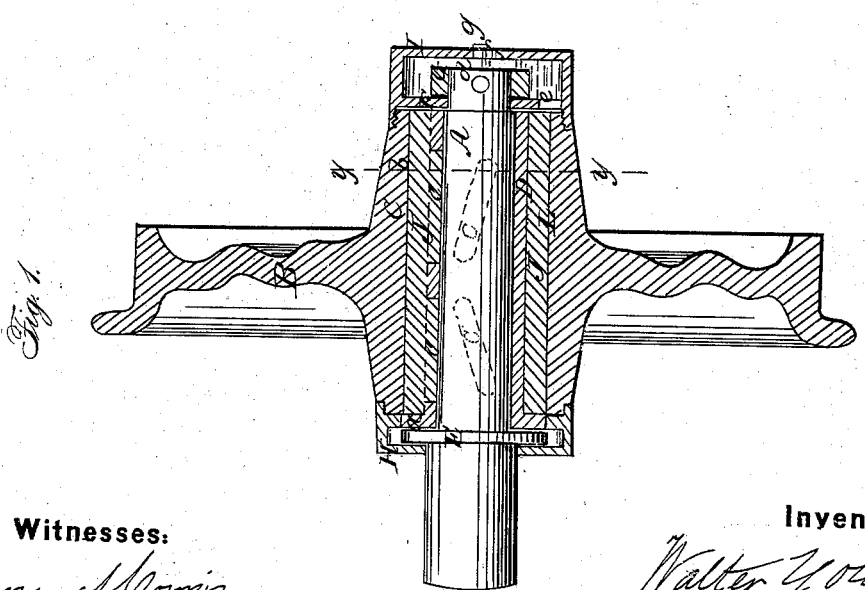

UNITED STATES PATENT OFFICE.

WALTER YOUMANS, OF LANSINGBURG, NEW YORK.

IMPROVEMENT IN MODES OF LUBRICATING CAR-WHEELS.

Specification forming part of Letters Patent No. 48,230, dated June 13, 1865.

*To all whom it may concern:*

Be it known that I, WALTER YOUMANS, of Lansingburg, in the county of Rensselaer and State of New York, have invented a new and useful Improvement in Lubricating Car-Wheels; and I do hereby declare that the following is a full, clear, and exact description thereof, which will enable others skilled in the art to make and use the same, reference being had to the accompanying drawings, forming part of this specification, in which—

Figure 1 is a section of a car-wheel and its axle with my improvement applied to it, $x\ x$, Fig. 2, indicating the line of section; Fig. 2, a section of the same, taken in the line $yy$, Fig. 1.

Similar letters of reference indicate like parts.

This invention relates to a new and improved mode of keeping car-wheels in a proper state of lubrication, those which run loosely on their axles; and it consists in having the box which is fitted centrally in the wheel to receive the journal of the axle encompassed by chambers or recesses in which cotton-waste or other proper absorbent material saturated with oil or other lubricating substance is placed and brought in contact with the journal of the axle by means of slots or openings in the box.

The invention further consists in an oil-receptacle applied to the wheel and arranged in such a manner as to keep the cotton-waste properly supplied with oil, while at the same time dust is excluded from the oil-receptacle and journal.

A represents a journal of a car-axle, and B a wheel fitted loosely thereon. The wheel B is cast with a hub, C, in which a box, D, is fitted, one end of the latter being provided with a flange, $a$, which bears against the inner end of the hub C, as shown clearly in Fig. 1. The hub C has a number of holes or openings, $b$, passing longitudinally through it adjoining the box D. Three of these holes or openings are shown in Fig. 2, but more or less of them may be used, and the box D has slots or openings $c$ made in it—any suitable number—which afford a communication between the openings $b$ and the interior of the box D. The box D is fitted loosely on the journal A, and the latter is provided with a collar, E, which bears against the flange $a$ of the box D, (see Fig. 1,) and the outer end of the journal A has a washer, F, and a collar, G, upon it, a pin, $d$, passing through the collar and journal.

On the inner end of the hub C there is screwed or secured by bolts in any proper way a cap, H, which fits over the collar E. The cap H prevents dust entering the hub at its inner end. The collar E, washer F, and collar G, with the pin $d$, secure the hub on the journal A.

I is a cylindrical box, which is screwed on the outer end of the hub C or secured to it by bolts in any suitable manner. This box serves as an oil-receptacle.

The holes or openings $b$ are filled with cotton-waste J, or other absorbent material, which comes in contact with the journal A by means of the slots or openings $c$ in the box D. The waste J is kept supplied with oil from the box I through an opening, $e$, as shown in Fig. 1. The box I has a hole, $f$, in it, stopped with a plug, $g$, said box being supplied with oil through the hole $f$. By this arrangement the journal A is kept in a proper state of lubrication.

I claim as new and desire to secure by Letters Patent—

1. The employment or use, in connection with a box, D, of a car-wheel, of a series of holes or openings, $e$, in the hub C, encompassing the box D, and the latter provided with slots or openings $c$, the holes or openings $b$ being filled with cotton-waste saturated with oil or other proper lubricating material, and all arranged substantially as and for the purpose herein set forth.

2. In connection with the parts aforesaid, the oil-receptacle I, applied to the outer end of the hub, substantially as and for the purpose herein specified.

WALTER YOUMANS.

Witnesses:
H. CLAY SMITH,
C. WEAVER.